US006560934B1

(12) United States Patent
Workman

(10) Patent No.: US 6,560,934 B1
(45) Date of Patent: May 13, 2003

(54) SNAPPABLE SHIM ASSEMBLY

(75) Inventor: Gary Workman, Bellwood, IL (US)

(73) Assignee: Deslauriers, Inc., Bellwood, IL (US)

( * ) Notice: Subject to any disclaimer, the term of this patent is extended or adjusted under 35 U.S.C. 154(b) by 0 days.

(21) Appl. No.: 10/122,623

(22) Filed: Apr. 15, 2002

(51) Int. Cl.[7] .............................. E04B 9/00; E06B 1/04; E06B 3/30; F16M 11/24
(52) U.S. Cl. ..................... 52/126.1; 52/217; 52/204.56; 248/188.2
(58) Field of Search ............................. 52/126.1, 213, 52/211, 215, 217, 204.56, 122.1, 656.2; 248/188.2

(56) References Cited

U.S. PATENT DOCUMENTS

| | | | | |
|---|---|---|---|---|
| 3,413,761 A | * | 12/1968 | Proni | 49/396 |
| 3,867,887 A | * | 2/1975 | Saidel | 108/53.3 |
| 4,075,518 A | * | 2/1978 | Koehler et al. | 310/156.32 |
| 4,460,832 A | * | 7/1984 | Bigham | 250/252.1 |
| 4,713,922 A | * | 12/1987 | Ingold | 254/104 |
| 4,809,421 A | * | 3/1989 | Justice | 248/188.2 |
| 4,990,116 A | * | 2/1991 | Chen | 446/124 |
| 5,054,250 A | * | 10/1991 | Foss | 254/104 |
| 5,095,499 A | * | 3/1992 | Wentz | 378/207 |
| 5,640,813 A | * | 6/1997 | Glazik et al. | 248/188.2 |
| 5,815,992 A | * | 10/1998 | Wells et al. | 248/188.2 |
| 5,947,652 A | * | 9/1999 | Wagner | 408/1 R |
| 5,986,852 A | * | 11/1999 | Berg et al. | 360/244.9 |
| 6,018,916 A | * | 2/2000 | Henry | 254/104 |
| 6,050,044 A | * | 4/2000 | McIntosh | 446/124 |
| 6,102,766 A | * | 8/2000 | Leadbetter et al. | 446/124 |
| 6,159,575 A | * | 12/2000 | Rathsack | 428/119 |
| 6,244,334 B1 | * | 6/2001 | Wu et al. | 165/153 |
| 6,254,140 B1 | * | 7/2001 | Erwin | 285/3 |

* cited by examiner

*Primary Examiner*—Carl D. Friedman
*Assistant Examiner*—Kevin McDermott
(74) *Attorney, Agent, or Firm*—Wood, Phillips, Katz, Clark & Mortimer

(57) ABSTRACT

A shim assembly comprises a first shim piece having a generally planar body and a plurality of spaced apart projections extending upwardly therefrom. A second shim piece has a generally planar body and a plurality of spaced recesses. The recesses are slightly larger than the projections and spaced apart similar to the spacing of the projections to receive the projections and maintain the first and second shim pieces in an assembled condition.

19 Claims, 5 Drawing Sheets

SNAPPABLE SHIM ASSEMBLY

FIELD OF THE INVENTION

This invention relates to shims used in construction projects and, more particularly, to snappable shims.

BACKGROUND OF THE INVENTION

In building construction, both commercial and residential, a wall is typically constructed with openings provided for doors and windows. In commercial construction, the walls are often poured concrete. In residential construction, the walls are typically wood frame. As is apparent, either type of material may be used in either type of construction.

Doors and windows are manufactured off site to specifications. As such, a door or window will fit a specific sized opening. The wall openings are generally larger than the door or window frame nominal size. This ensures that the window will fit and provides room to allow for leveling of the window or door.

When installing the window or door, the frame is typically inserted into the wall opening. Thereafter, shims are used to position the window or door frame in a desired, level position. To work effectively; these shims must provide for different spacing at different points around the periphery of the frame. One conventional type of shim is in the form of a wedge. A pair of shims are stacked together, with the wide ends opposite one another. As a result, moving the shim wide ends toward or away from one another, increases or decreases, respectively, the spacing provided by the stacked shims. One problem with such shims is that in vertical gaps the shims must be held in place during installation. With wood frame construction, these wedge shims, which are typically also wood, are held in place by hammering a nail through the frame and into the shims.

In the precast/prestress construction industry, shim assembly packs are often provided for selected spacing, typically $11/16$th inch. These packs are usually made up of three $1/4$ inch, two $1/8$ inch and one $1/16$ inch shim pieces held together with a rubber band. Thus, the selection of individual shim pieces provide a range of $1/16$ inch to $11/16$ inch. The individual shim pieces consist of a square plastic plate. However, the use of the rubber bank adds thickness to the shim pieces. Moreover, should the rubber band break or become stretched over time, it may not hold the shim pieces together properly.

The present invention is directed to solving one or more of the problems discussed above in a novel and simple manner.

SUMMARY OF THE INVENTION

In accordance with the invention, there is provided a snappable shim assembly.

Broadly, there is disclosed herein a shim assembly comprising a first shim piece having a generally planar body and plurality of spaced apart projections extending upwardly therefrom. A second shim piece has a generally planar body and a plurality of spaced recesses. The recesses are slightly larger than the projections and spaced apart similar to the spacing of the projections to receive the projections and maintain the first and second shim pieces in an assembled condition.

In accordance with one aspect of the invention, each of the first and second shim piece planar bodies defines generally square shaped areas having first and second pins extending upwardly from the respective planar body at one set of diagonally opposite corners and bores in the planar body in another set of diagonally opposite corners. The bores may be through bores.

It is a feature of the invention that one of the first and second shim pieces includes an edge notch to facilitate separation off the first and second shim pieces.

In accordance with another aspect of the invention, the projections comprise dovetails and the recesses comprise dovetail grooves.

It is a further feature of the invention that each of the first and second shim piece planar body define generally horseshoe shaped bodies.

It is still another feature of the invention that the projections comprise dovetails in opposite legs of the first shim piece horseshoe shaped body and the recesses comprise dovetail grooves in opposite legs of the second shim piece horseshoe shaped body.

It is a further feature of the invention to provide a pin in each dovetail groove and a bore in each dovetail for receiving one of the pins to prevent slidable movement of the first and second shim pieces relative to one another.

There is disclosed in accordance with another aspect of the invention, a snappable shim assembly comprising a plurality of shim pieces. Each shim piece has a generally planar body and first and second spaced apart pins extending upwardly from the planar body and a plurality of bores in the planar body spaced apart similar to spacing of the first and second pins. The bores are slightly larger than the pins. The plurality of shims can be stacked together with the pins of each of the plurality of shim pieces being received in the bores of another of the plurality of shim pieces with a snap fit to maintain the plurality of shim pieces in an assembled condition.

It is a feature of the invention that the bores comprise through bores.

It is another feature of the invention that each of the planar bodies defines a generally square shaped area having the first and second pins extending upwardly at one'set of diagonally opposite corners and the bores in the planar body are at diagonally opposite corners. The bores may comprise through bores at different corners than are the pins.

It is a further feature of the invention that each of the plurality of shim pieces includes an edge notch to facilitate separation of the shim pieces.

There is disclosed in accordance with a further aspect of the invention, a snappable shim assembly comprising a plurality of shim pieces. Each shim piece has a generally planar body. One surface of the planar body has a plurality of elongated dovetails extending upwardly therefrom. Another surface of the planar body has a plurality of dovetail grooves aligned with the dovetails. The dovetail grooves are slightly larger than the dovetails. The plurality of shims can be stacked together with the dovetails of each of the plurality of shim pieces being received in the dovetail grooves of another of the plurality of shim pieces with a snap fit to maintain the plurality of shim pieces in an assembled condition.

It is a feature of the invention that each of the shim piece planar bodies defines a generally horseshoe shaped body.

It is another feature of the invention that each of the shim piece planar bodies defines a generally horseshoe shaped body and first and second dovetails and dovetail grooves are in legs of the horseshoe shaped body.

It is still another feature of the invention that third dovetails and dovetail grooves are in a cross portion of the horseshoe shaped body.

It is still another feature of the invention to provide a pin in each first and second dovetail grooves and a bore in each first and second dovetails for receiving one of the pins to prevent slidable movement of the shim pieces relative to one another.

It is still a further feature of the invention that the dovetail grooves are longer than the dovetails.

It is still yet another feature of the invention to provide a first end shim piece having a generally planar body and one surface of the planar body having a plurality of elongated dovetails extending upwardly therefrom and a second end shim piece having a plurality of dovetail grooves in one surface of the planar body. The plurality of shims can be stacked together between the first and second end shims.

Further features and advantages of the invention will be readily apparent from the specification and from the drawings.

DETAILED DESCRIPTION OF THE INVENTION

The present invention relates to a snappable shim assembly adapted for use in building construction and utilizing, shim pieces having interlocks. The interlocks enable the shim pieces to snap together. This holds the shim pieces together during installation while providing minimal loss in compression strength.

Figure 1:
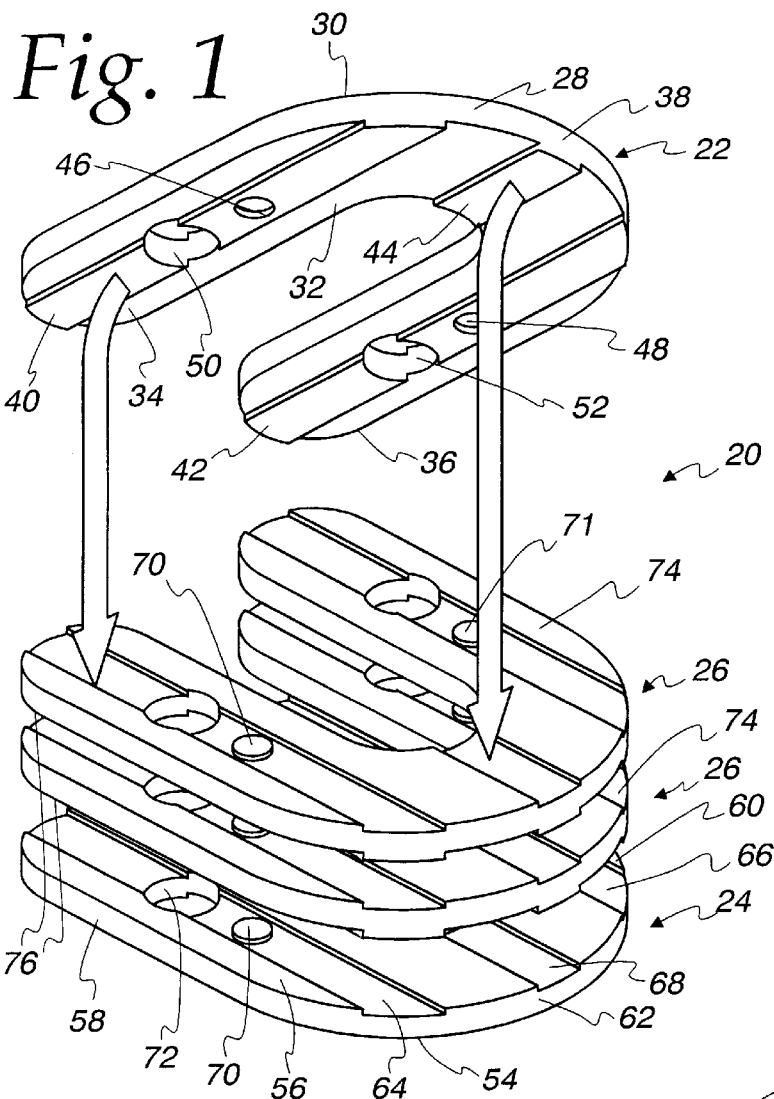
FIG. 1 is a perspective view illustrating a shim assembly in accordance with the invention with a plurality of stacked shim pieces spaced apart from one another.
Figure 2:
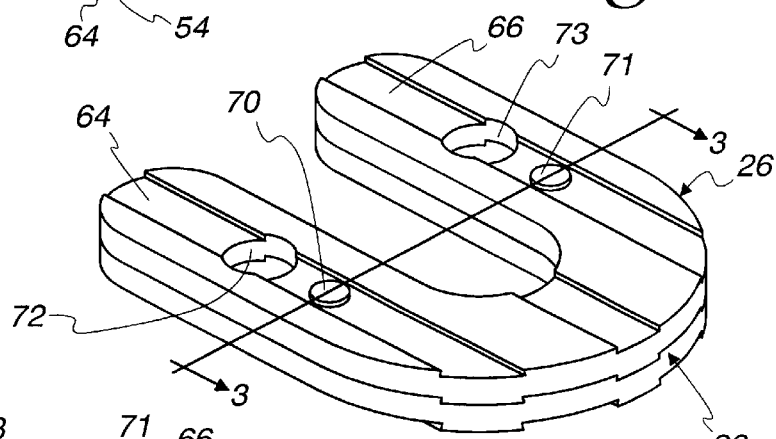
FIG. 2 is a perspective view illustrating a pair of the shim pieces of FIG. 2 snapped together.
Figure 3:
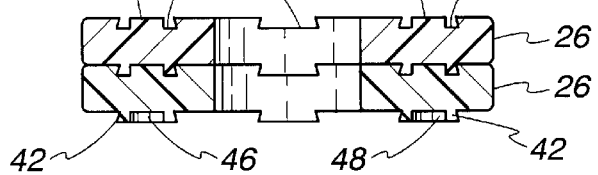
FIG. 3 is a sectional view taken along the line 3—3 of FIG. 2.

Referring to FIGS. 1–3, a snappable shim assembly 20 in accordance with a first embodiment of the invention is illustrated. The snappable shim assembly 20 includes a first end shim piece 22, a second end shim piece 24 and a plurality, two in the illustrated embodiment, of middle shim pieces 26. Each of the shim pieces 22, 24 and 26 is generally u-shaped or horseshoe shaped and is of one piece molded plastic construction.

The first end shim piece 22 comprises a generally planar body 28 having an upper surface 30 and an opposite lower surface 32. As used herein, the terms "upper" and "lower" are used in a relative sense to describe the various elements as shown in the drawings. The terms "upper" and "lower" are not intended to describe how the various embodiments are used in practice as the snappable shims can be positioned in any orientation. Thus, the terms "upper" and "lower" are used for simplicity in the following description.

The first end shim piece 22 includes a first leg 34 and a second leg 36 connected by a connecting portion 38. The upper surface 30 comprises a generally planar surface. The upper surface 30 may be smooth or it may be textured to enhance gripping. Additionally, a non-skid material may be provided to the upper surface 30 to further facilitate gripping, in use.

The lower surface 32 includes a first elongated dovetail 40 extending from the first leg 34, a second elongated dovetail 42 extending from the second leg 36 and a third elongated dovetail 44 extending from the connecting portion 38. The dovetails 40, 42 and 44 are parallel to one another. However, for snapability they need not be parallel. A counter bore 46 is centrally located in the first dovetail 40. Similarly, a counter bore 48 is centrally located in the second dovetail 42. A first through bore 50 is provided through the first leg 34. A second through bore 52 is provided through the second leg 36.

The second end shim piece 24 includes a lower surface 54 and upper surface 56. The second end shim piece 24 is also horseshoe shaped including a first leg 58, a second leg 60 and a connecting portion 62. The lower surface 54 is planar, similar to the first end shim piece upper surface 30. The second end shim piece upper surface 56 includes an elongated dovetail groove 64 in the first leg 58, a second elongated dovetail groove 66 in the second leg 60, and a third elongated dovetail groove 68 in the connecting portion 62. The dovetail grooves 64, 66 and 68 are parallel to one another and spaced similar to spacing of the dovetails 40, 42 and 44 of the first end shim piece 22, discussed above. A nipple or pin 70 extends upwardly within the first dovetail groove 64. A similar pin 71 extends upwardly from the second dovetail groove 66. The spacing of the pins 70 and 71 is similar to spacing between the first end shim piece counter bores 46 and 48. A through bore 72 is provided through the first leg 58. A similar through bore 73 is provided through the second leg 60.

Each of the middle shim pieces 26 includes an upper surface 74 and a lower surface 76. Each upper surface 74 is identical to the second end shim piece upper surface 56. Each middle shim piece lower surface 76 is identical to the first end shim piece lower surface 32. Therefore, reference numerals for elements of the upper surface 74 and the lower surface 76, where shown, are the same as those for the respective second end shim piece upper surface 56 and the first end shim piece lower surface 32.

The thickness of the shim pieces 22, 24 and 26 can be selected as desired. In the illustrated embodiment of the invention the dovetails 40, 42 and 44 have a depth of approximately 0.030 inches. Likewise, the dovetail groove 64, 66 and 68 have a depth of approximately 0.030 inches. However, as is apparent, the dovetails 40, 42 and 44 are slightly smaller than the dovetail grooves 64, 66 and 68 to be received therein. Particularly, and with reference to FIG. 1, the two middle shim pieces 26 can be snap fit together by aligning the middle shim pieces 26 with the dovetails 40, 42 and 44 positioned just above the respective dovetail groove 64, 66 and 68 and with the pins 70 and 71 longitudinally aligned with the respective counter bores 46 and 48. By squeezing the middle shim pieces 26 together, the dovetails are forced into the grooves where they provide a snap fit connection with the pins 70 and 71 in the counter bores 46 and 48 preventing slidable movement of the shim pieces 26, as shown in FIGS. 2 and 3. Thereafter, the end shim pieces 22 and 24 can be snapped to either side of the middle shim pieces 26, as generally illustrated in FIG. 1.

The through bores 72 and 73 reduce weight and cost of the shim pieces 22, 24 and 26.

Thus, in accordance with the first embodiment to the invention, a snappable shim assembly of varying thickness can be provided. A relatively narrow shim assembly can be provided by using only the first and second end shim pieces 22 and 24. Likewise, a shim assembly can be provided using only two or more of the middle shim pieces 26. However, such an assembly will not have smooth outer surfaces. Any number of the middle shim pieces 26 can be stacked between the first end shim piece 22 and the second end shim piece 24, as will be apparent.

Figure 4:
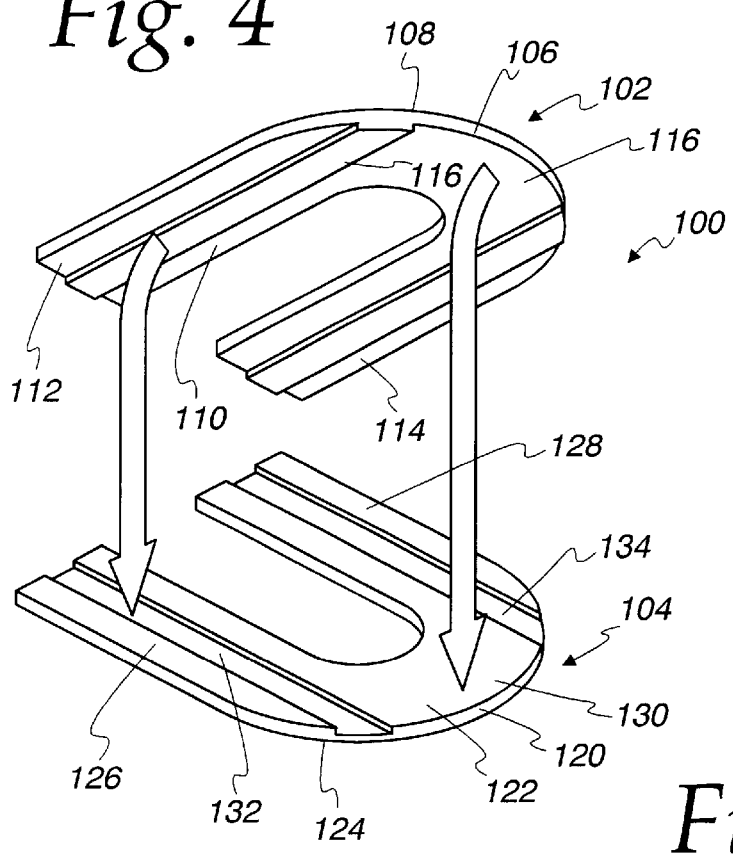
FIG. 4 is a perspective view, similar to FIG. 1, for a shim assembly in accordance with another aspect of the invention.
Figure 5:
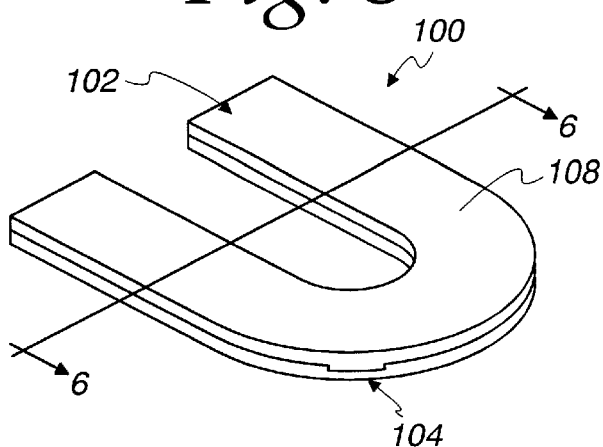
FIG. 5 is a perspective view of the shim assembly of FIG. 4 with the shim pieces snapped together.
Figure 6:
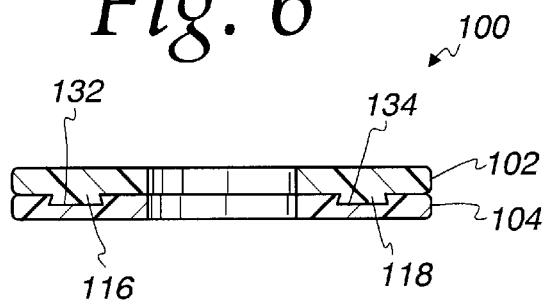
FIG. 6 is a sectional view taken along the line 6—6 of FIG. 5.

Referring to FIGS. 4–6, a snappable shim assembly 100 in accordance with a second embodiment of the invention is illustrated. The snappable shim assembly 100 includes a first shim piece 102 and a second shim piece 104. The shim pieces 102 and 104 are horseshoe shaped, as with the embodiment of FIG. 1.

The first end shim piece, 102 comprises a horseshoe shaped planar body 106 having an upper surface 108 and a lower surface 110. A first leg 112 and a second leg 114 are connected by a connecting portion 116. The upper surface 108 is planar. The lower surface 110 includes an elongated dovetail 116 in the first leg 112 and a elongated dovetail 118 in the second leg 114. The dovetails 116 and 118 are parallel.

The second end shim piece 104 includes a horseshoe shaped planar body 120 including an upper surface 122 and a lower surface 124. A first leg 126 and a second leg 128 are connected by a connecting portion 130. The lower surface 124 is planar. The upper surface 122 includes an elongated dovetail groove 132 in the first leg 126 and an elongated dovetail groove 134 in the second leg 128. The dovetail grooves 132 and 134 are parallel and spaced apart similar to the dovetails 116 and 118. The dimensions of the dovetails 116 and 118 and the dovetail grooves 132 and 134 may be similar to that described above relative to the embodiment of FIG. 1. Particularly, the dovetails 116 and 118 are slightly smaller than the dovetail grooves 132 and 134 to be received therein in a snap fit construction. The shim pieces 102 and 104 are snapped together, similar to that discussed above, and as shown in FIG. 5 and in cross section in FIG. 6. As a result, the dovetail 118 is snap fit into the dovetail groove 134. Likewise, the dovetail 116 is snap fit into the dovetail groove 132, as shown in FIG. 6.

Figure 7:
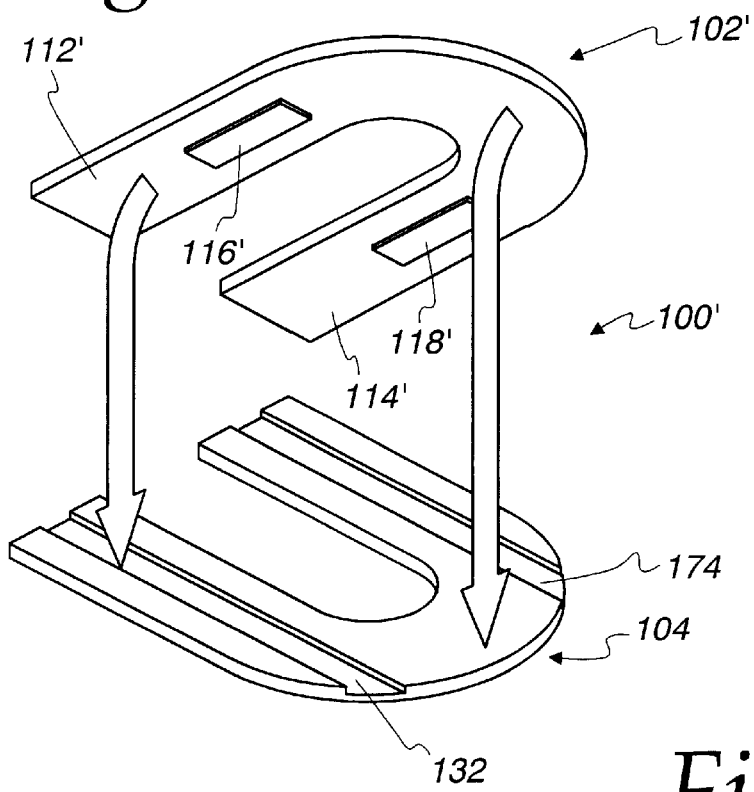
FIG. 7 is a perspective view, similar to FIG. 1, for a shim assembly according to a further embodiment to the invention.
Figure 8:
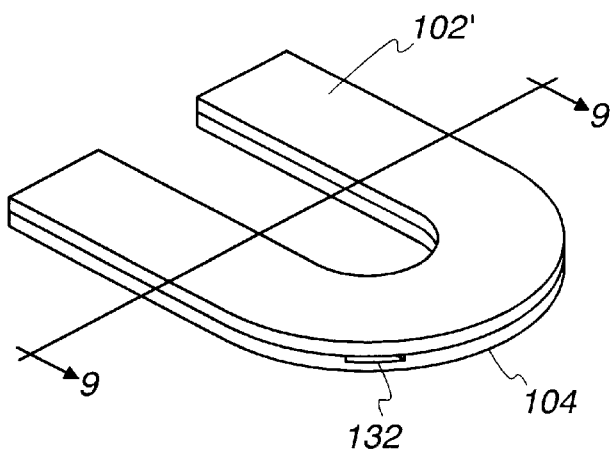
FIG. 8 is a perspective view of the shim assembly of FIG. 7 with the shim pieces snapped together.
Figure 9:
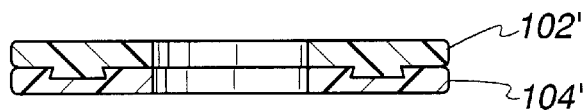
FIG. 9 is a sectional view taken along line 9—9 of FIG. 8.

Referring to FIG. 7–9, a snappable shim assembly 100' in accordance with a third embodiment of the invention is illustrated. The snappable shim assembly 100' uses a first shim piece 102' and the second shim piece 104, discussed above. The first shim piece 102' of FIG. 7 differs from the first shim piece 102 of FIG. 4 in that dovetails 116' and 118' do not extend the full length of respective legs 112' and 114'.

As is apparent, with the embodiments of FIGS. 4–9, pins, such as the pins 70 and 71 of FIGS. 1–3 and counter bores, such as the counter bores 46 and 48 of FIGS. 1–3, could also be used to prevent slidable movement. However, in the embodiments of FIGS. 4–9, the shim pieces can be slid together for assembly or disassembly in addition to being snap fit together.

Figure 10:
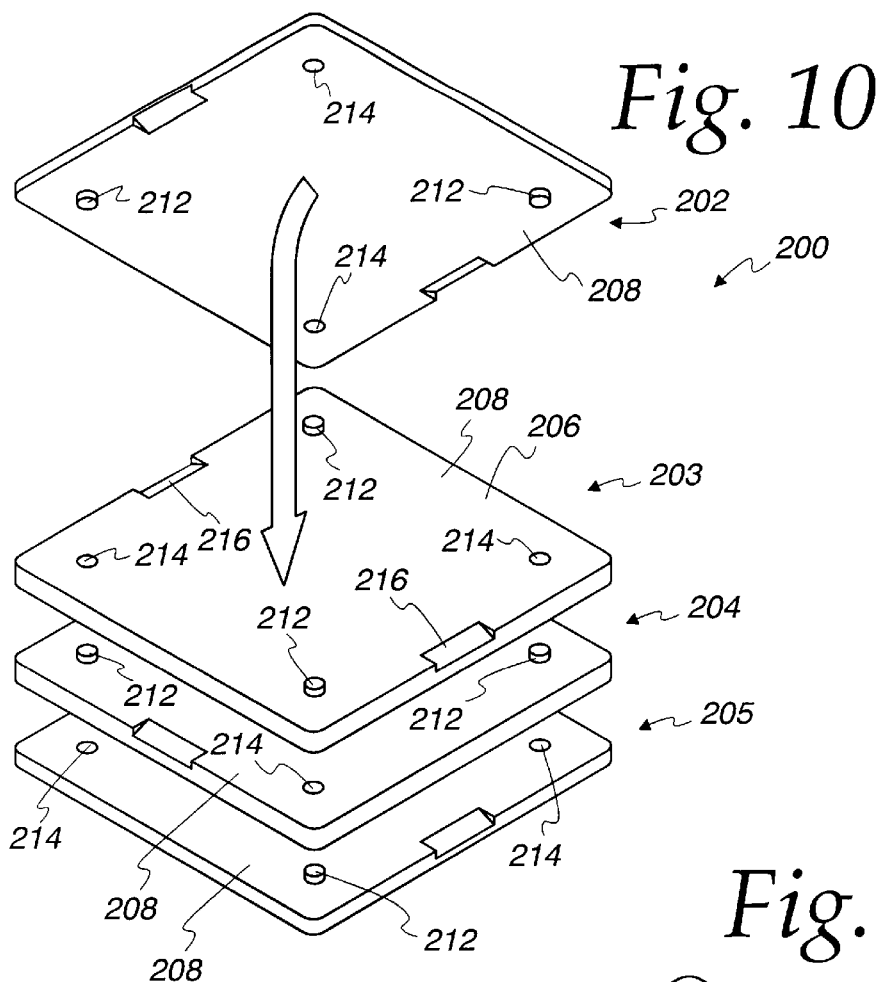
FIG. 10 is a perspective view of a shim assembly in accordance with yet another aspect of the invention with a plurality of stacked shim pieces spaced apart from one another.
Figure 11:
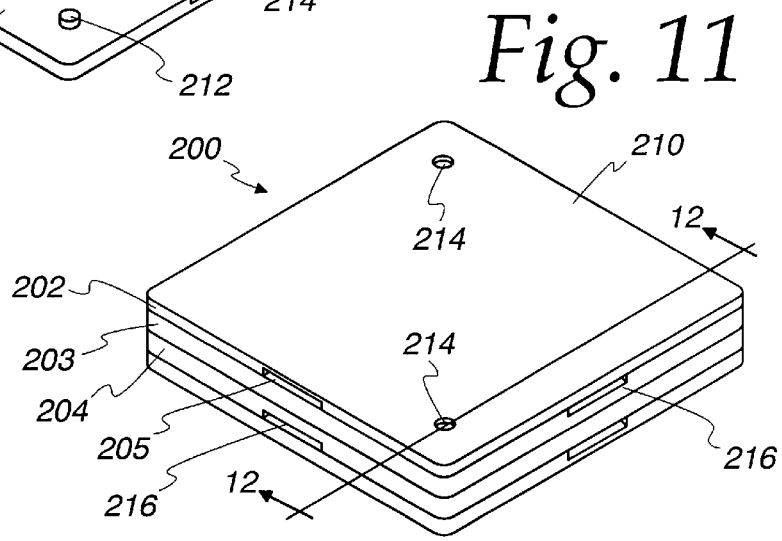
FIG. 11 is a perspective view of the shim assembly of FIG. 10 with the shim pieces snapped together.
Figure 12:
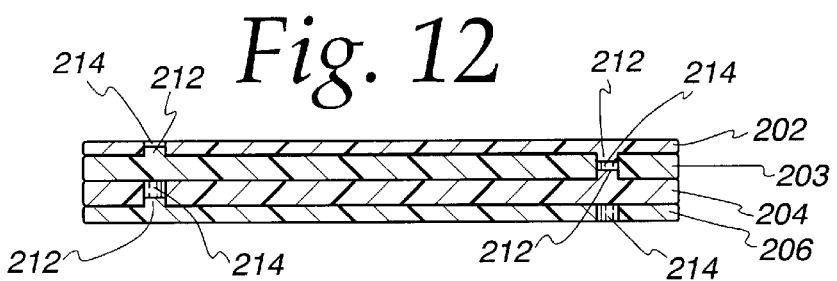
FIG. 12 is a sectional view taken along the line 12—12 of FIG. 11.

Referring to FIGS. 10–12, a snappable shim assembly 200 in accordance with a further embodiment of the invention is illustrated. The snappable shim assembly 200 includes four shim pieces 202, 203, 204 and 205. The shim pieces 202–205 are illustrated spaced apart in FIG. 10, and snapped together in FIGS. 11 and 12. Each of the shim pieces 202–205 are generally identical in construction. However, the thickness of the individual shim pieces 202–205 may be different to provide variation in overall thickness of the assembly 200, as described below. For simplicity, like reference numerals are used with respect to individual elements of each of the shim pieces 202–205.

Each shim piece 202–205 includes a generally squared-shaped planar body 206 having a first surface 208 and a second surface 210. Referring particularly to FIG. 10, the first surface 208 includes a pair of pins 212 extending upwardly therefrom at diagonal opposite corners. A pair of through bores 214 are provided through the planar body 206 at the other diagonally opposite corners. The through bores 214 are illustrated through the second surface 210 in FIG. 11. Notches 216 are provided along opposite side edges on the first surface 208. The second surface 210 comprises a planar surface.

The pins 212 are approximately 0.100 inches in height. The pins have a radius slightly smaller than the inner diameter of the through bores 214. The spacing between the pair of pins 212 is identical to the spacing between the bores 214.

The method of assembling the shim pieces 202–205 together to form the shim assembly 200 is illustrated particularly in FIG. 10. The shim pieces 202–205 are positioned above one another with each shim pieces being rotated ninety degrees relative to the adjacent shim pieces. As an example, the shim piece 204 is rotated ninety degrees relative to the shim piece 205 so that the pins 212 of the shim piece 205 are positioned below the openings 214 of the shim piece 204. The shim pieces 204 and 205 can then be pressed together with the pins 212 providing a snap fit within the openings 214 to maintain the shim pieces 204 and 205 in an assembled condition. Similarly, the shim piece 203 is positioned in an orientation similar to the shim piece 205 and then snap fit to the shim piece 204. As is apparent, the pins 212 of the shim piece 203 extend upwardly. To provide a generally planar outer most surface, the shim piece 202 is turned over so that its first surface 208 faces the first surface 208 of the shim piece 203. It is then rotated so that the pins 212 of each of the shim pieces 202 and 203 are in alignment with the openings 214 of the other of the shim piece 203 and 202, as shown. They can then be snap fit together.

With the above explanation, the shim pieces are 202–205 are snapped together individually. Instead, they could be appropriately positioned together and snap fit together at one time. As is apparent, the height of the pins 212 must be less than half of the thickness of at least one of the planar bodies 206 as two of the pins 212 are received in a single opening 214 of the second shim piece 203, as shown in FIG. 12.

The edge notches 216 can be used as a thumb slot or screwdriver slot or the like to disassemble the shim assembly 200.

The illustrated embodiment to the invention, the shim pieces 202–205 are one piece molded plastic construction.

However, select ones of the shim pieces, to be used as the outer most shim pieces, can be molded from a rubber like material to provide a non-skid shim assembly. Alternatively, a rubber like or other non-skid surface could be provided on the second surface 210 of some or all of the shim pieces 202–205.

In the illustrate embodiment to the invention, the shim pieces 202–205 include through bores 214. It is apparent, the bores 214 could instead be counterbores through the second surface 210. In so doing, one of the outer most shim pieces would have pins 212 extending outwardly therefrom. If this is undesirable, then an end shim piece could be provided with no pin 212 on the first surface to provide planar surface at both ends of the assembly.

Likewise, in the illustrated embodiment to the invention, the shim assembly 200 uses square-shaped shim pieces 202–205. As is apparent, the shim pieces 202–205 could be other shapes, such as circular or otherwise. However, the pins 212 and openings 214 would be provided in a generally square-shaped area within the particular body. Alternatively, shapes such as hexagon or octagon could be used with pins and openings at alternating "corners" defined by intersecting side edges, as will be apparent to those skilled in the art.

Figure 13:
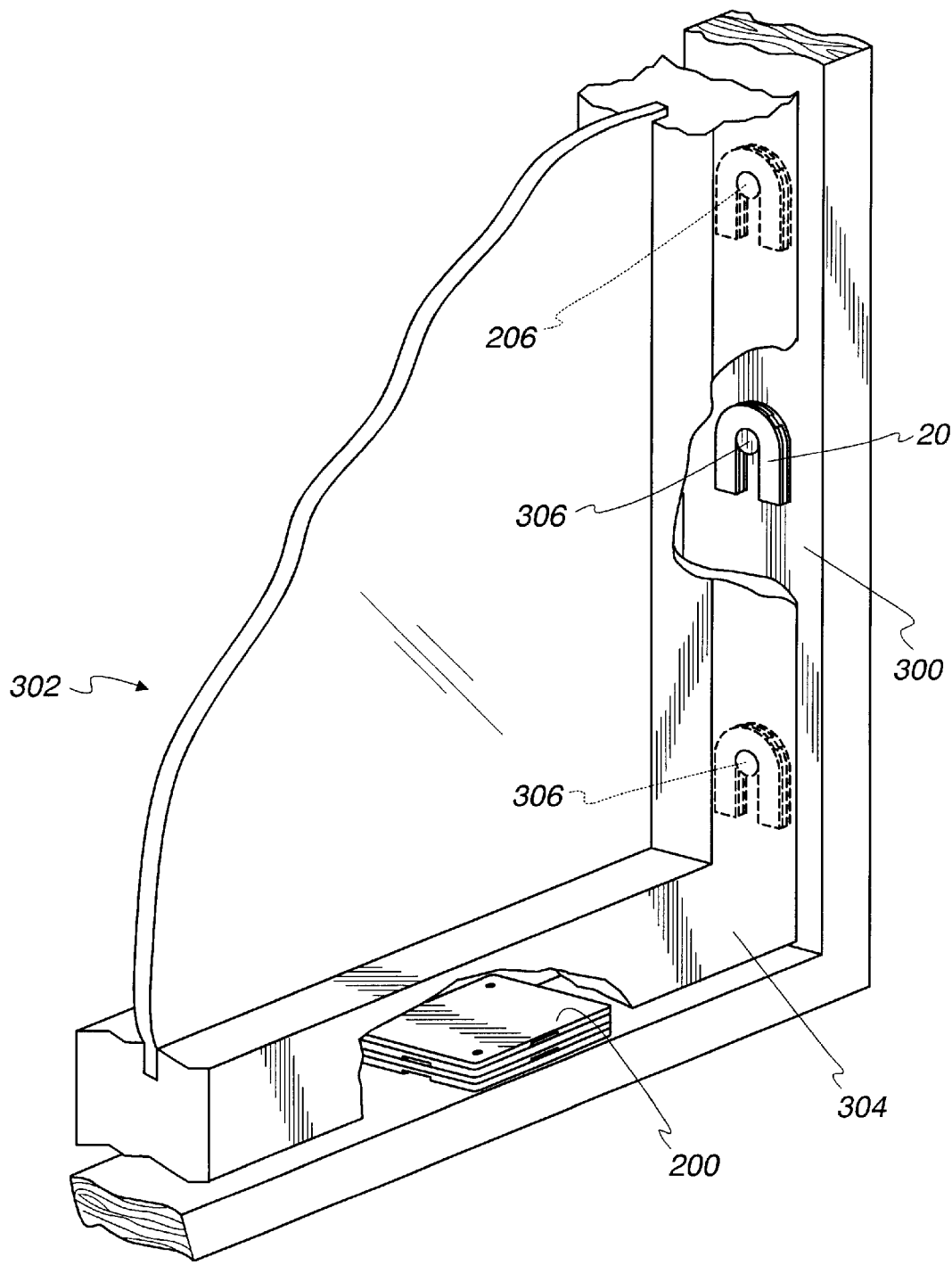
FIG. 13 is a perspective view of a window frame in a building opening showing use of the shim assemblies in accordance with the invention.

Referring to FIG. 13, the shim assembly 200 of FIG. 10 and the shim assembly 20 of FIG. 1, are illustrated in use. Particularly, a building is constructed to include a rectangular shaped opening 300. A window 302 includes a rectangular frame 304 of a size smaller than the rectangular opening 300. The window frame 304 is bolted into the opening 300 using bolts 306. The horseshoe shaped shim assemblies 20 can be mounted, onto the bolts 306 to provide appropriate desired spacing between the opening 300 and frame 304. The square shaped shim assembly 200 can be used at the bottom, and/or the top, to provide appropriate spacing between the frame 304 and the opening 300.

Thus, in accordance with the invention, there is provided a snappable shim assembly in which shim pieces are snapped together for easy assembly and disassembly.

I claim:

1. A shim assembly comprising:
   a first shim piece having a generally planar body and a plurality of spaced apart projections extending upwardly therefrom; and
   a second shim piece having a generally planar body and a plurality of spaced recesses, the recesses being slightly larger than the projections and spaced apart similar to spacing of the projections to receive the projections and maintain the first and second shim pieces in an assembled condition,
   wherein each of the first and the second shim piece planar bodies define generally square shaped areas having first and second pins extending upwardly from the respective planar body at one set of diagonally opposite corners and bores in the planar body at another set of diagonally opposite corners.

2. The shim assembly of claim 1 wherein the bores comprise through bores in the planar body.

3. The shim assembly of claim 1 wherein one of the first and second shim pieces includes an edge notch to facilitate separation of the first and second shim pieces.

4. A shim assembly comprising:
   a first shim piece having a generally planar body and a plurality of spaced apart projections extending upwardly therefrom; and
   a second shim piece having a generally planar body and a plurality of spaced recesses, the recesses being slightly larger than the projections and spaced apart similar to spacing of the projections to receive the projections and maintain the first and second shim pieces in an assembled condition,
   wherein the projections comprise dovetails and the recesses comprise dovetail grooves.

5. The shim assembly of claim 4 wherein each of the first and the second shim pieces planar bodies define generally horseshoe shaped bodies.

6. The shim assembly of claim 4 wherein each of the first and the second shim pieces planar bodies define generally horseshoe shaped bodies and the projections comprise dovetails in opposite legs of the first shim piece horseshoe shaped body and the recesses comprise dovetail grooves in opposite legs of the second shim piece horseshoe shaped body.

7. The shim assembly of claim 6 further comprising a pin in each dovetail groove and a bore in each dovetail for receiving one of the pins to prevent slidable movement of the first and second shim pieces relative to one another.

8. A snappable shim assembly comprising:
   a plurality of shim pieces, each shim piece having a generally planar body and first and second spaced apart pins extending upwardly from the planar body and a plurality of bores in the planar body spaced apart similar to spacing of the first and second pins, the bores being slightly larger than the pins, whereby the plurality of shims can be stacked together with the pins of each of the plurality of shim pieces being received in the bores of another of the plurality of shim pieces with a snap fit to maintain the plurality of shim pieces in an assembled condition.

9. The snappable shim assembly of claim 8 wherein the bores comprise through bores.

10. The snappable shim assembly of claim 8 wherein each of planar bodies defines a generally square shaped area having the first and second pins extending upwardly at one set of diagonally opposite corners and the bores in the planar body are at diagonally opposite corners.

11. The snappable shim assembly of claim 10 wherein the bores comprise through bores at different corners than are the pins.

12. The snappable shim assembly of claim 9 wherein each of the plurality of shim pieces includes an edge notch to facilitate separation of the shim pieces.

13. A snappable shim assembly comprising:
   a plurality of shim pieces, each shim piece having a generally planar body and one surface of the planar body having a plurality of elongate dovetails extending upwardly therefrom and another surface of the planar body having a plurality of dovetail grooves aligned with the dovetails, the dovetail grooves being slightly larger than the dovetails, whereby the plurality of shims can be stacked together with the dovetails of each of the plurality of shim pieces being received in the dovetail grooves of another of the plurality of shim pieces with a snap fit to maintain the plurality of shim pieces in an assembled condition.

14. The snappable shim assembly of claim 13 wherein each of the shim piece planar bodies defines a generally horseshoe shaped body.

15. The snappable shim assembly of claim 13 wherein each of the shim piece planar bodies defines a generally horseshoe shaped body and first and second dovetails and dovetail grooves are in legs of the horseshoe shaped body.

16. The snappable shim assembly of claim 15 wherein third dovetails and dovetail grooves are in a cross portion of the horseshoe shaped body.

17. The snappable shim assembly of claim 15 further comprising a pin in each first and second dovetail groove and a bore in each first and second dovetail for receiving one of the pins to prevent slidable movement of the shim pieces relative to one another.

18. The snappable shim assembly of claim 15 wherein the dovetail grooves are longer than the dovetails.

19. The snappable shim assembly of claim 13 further comprising a first end shim piece having a generally planar body and one surface of the planar body having a plurality of elongate dovetails extending upwardly therefrom and a second end shim piece having a plurality of dovetail grooves in one surface of the planar body, whereby the plurality of shims can be stacked together between the first and second end shims.

* * * * *